H. S. BERRY.
COTTON CHOPPER ATTACHMENT.
APPLICATION FILED MAR. 9, 1910.
976,842.
Patented Nov. 29, 1910.
2 SHEETS—SHEET 1.
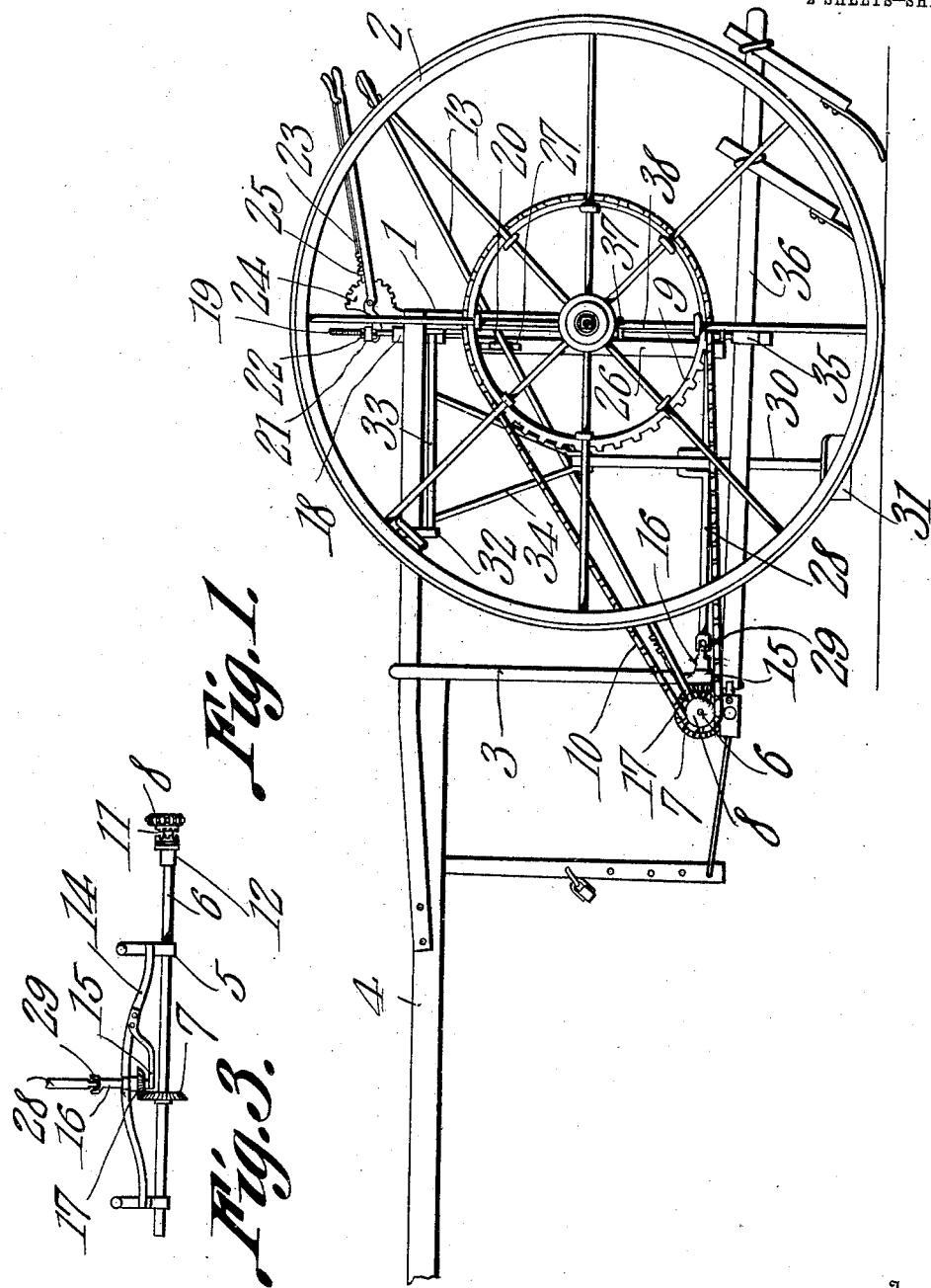
Inventor
Harvey S. Berry.
Witnesses
By C. A. Snow & Co.
Attorneys

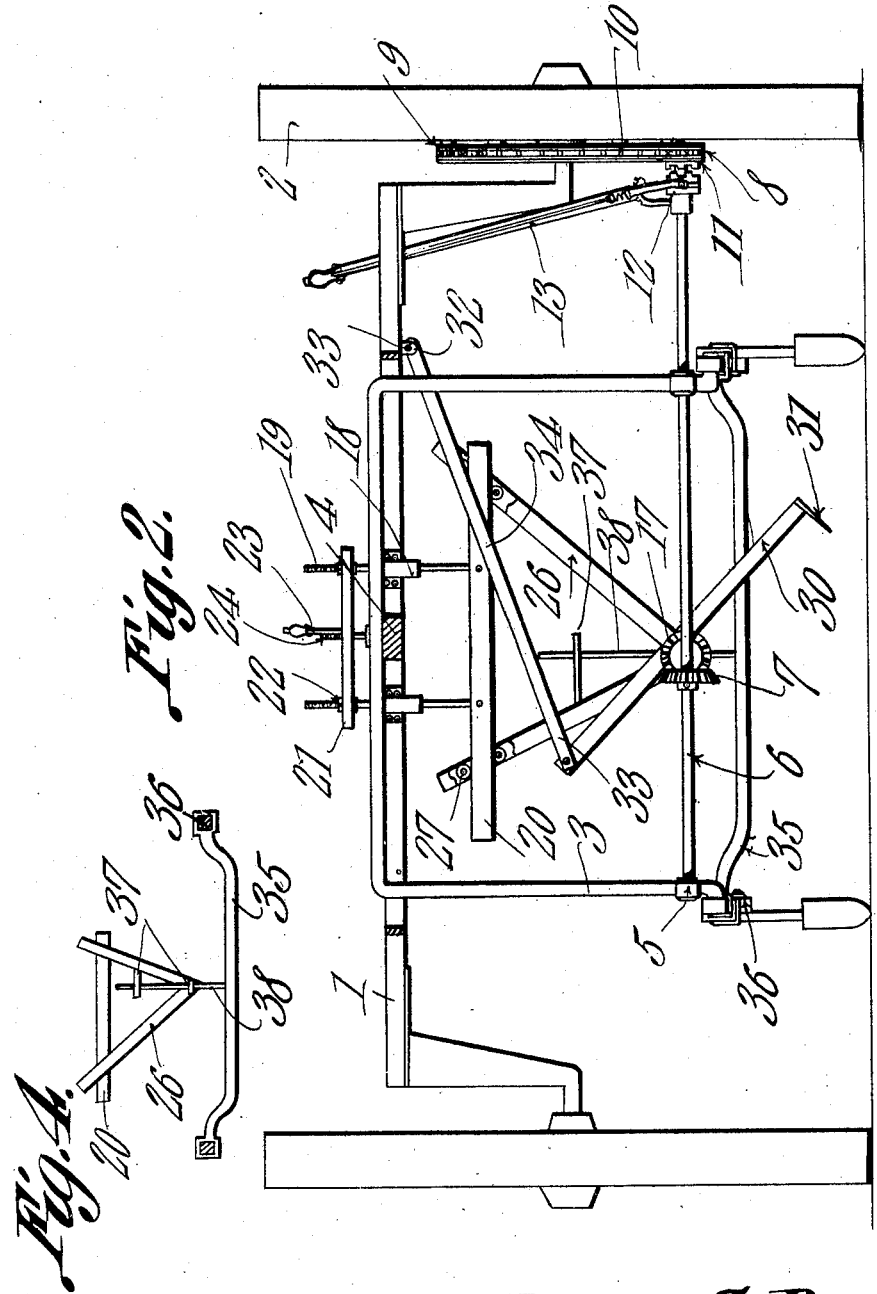

UNITED STATES PATENT OFFICE.

HARVEY SCOTT BERRY, OF MILFORD, TEXAS.

COTTON-CHOPPER ATTACHMENT.

976,842.  Specification of Letters Patent.  Patented Nov. 29, 1910.

Application filed March 9, 1910. Serial No. 548,310.

*To all whom it may concern:*

Be it known that I, HARVEY S. BERRY, a citizen of the United States, residing at Milford, in the county of Ellis and State of Texas, have invented a new and useful Cotton-Chopper Attachment, of which the following is a specification.

This invention has relation to a cotton chopper attachment especially adapted to be applied to the frames of cultivators and it consists in the novel construction and arrangement of its parts as hereinafter shown and described.

The object of the invention is to provide a simple and an effective structure adapted to be easily and quickly applied to the frame of a cultivator and operatively connected with one of the wheels thereof and which may be used for the purpose of thinning or chopping out undesirable plants in a row of cotton.

With the above object in view the attachment includes bearings adapted to be applied to the arch bar of the cultivator and in which is journaled a shaft. Means is provided for operatively connecting the said shaft with one of the supporting wheels of the cultivator frame and the said shaft carries a beveled pinion. A cross bar is supported by said bearings and carries a sub-shaft which in turn is provided with a beveled pinion which meshes with the first pinion. A frame is connected with the cultivator frame and means is provided for raising or lowering the first said frame and means is provided for connecting the first said frame with the beams of the cultivator whereby the frame will move laterally with the said beams. The rear end of a crank shaft is journaled in the last said frame and the forward end of the said crank shaft is connected with the said sub-shaft by means of a universal joint. The arm of a chopping hoe is mounted upon the crank of the said crank shaft and a link connects the upper end of the said arm with the frame of the cultivator.

Figure 1 is a side elevation of a cultivator showing the cotton chopper attachment applied thereto. Fig. 2 is a front elevation of the cotton chopper attachment applied to the frame of a cultivator. Fig. 3 is a plan view of a shaft and bearings which form parts of the invention. Fig. 4 is a detail view of a frame which is a part of the invention.

The cultivator frame to which the attachment is applied includes the usual arch axle 1 mounted upon supporting wheels 2 and having an arch bar 3 to which is connected the rear end of a tongue 4 in the usual manner. Bearings 5 are attached to the end portions of the arch bar 3 and a shaft 6 is journaled for rotation in the said bearings. A beveled gear wheel 7 is fixed to the intermediate portion of the shaft 6 and a sprocket wheel 8 is fixed to the end portion thereof. A sprocket rim 9 is attached to the side of one of the wheels 2 and a sprocket chain 10 passes around the wheels 8 and 9 and is adapted to transmit rotary movement from the wheel 2 to the sprocket wheel 8. The sprocket wheel 8 is loosely journaled upon the shaft 6 and is provided with a clutch hub 11. A clutch member 12 is slidably mounted upon the shaft 6 and is adapted to engage the hub 11 of the wheel 8. A lever 13 is suitably fulcrumed upon the frame of the cultivator and at its working end engages the clutch member 12 and when swung is adapted to move the said clutch member into engagement with the hub 11 or out of engagement therewith. A cross bar 14 is mounted upon the bearings 5 and is provided with a bearing 15. A sub-shaft 16 is journaled in the bearing 15 and is provided at its forward end with a beveled gear wheel 17 which meshes with the gear wheel 7 upon the shaft 6.

Vertically disposed guides 18 are attached to the intermediate portion of the arch axle 1 and rods 19 are slidably mounted in the said guides 18. A cross bar 20 is carried by the lower ends of the said rods 19. A cross bar 21 is adjustably attached to the upper portions of the rods 19 by means of clamp nuts 22 which are screw threaded upon the said rods and which bear against the upper and lower sides of the said cross bar 21 in the manner as indicated in Fig. 2 of the drawing. A lever 23 is fulcrumed upon the intermediate portion of the arch axle 1 and its working end is operatively connected with the cross bar 21. A segment 24 is located adjacent to said lever and the lever carries a spring actuated pawl 25 which is adapted to engage the teeth of the said segment 24. An approximately V-shaped frame 26 is slidably mounted upon the cross bar 20 and the said frame 26 is provided with rollers 27 which bear against the upper and lower edges of the said cross bar 20 and serve as anti-friction devices. The rear end of a crank shaft 28 is journaled in the lower or chopping edge portion of the V-shaped frame 26 and the forward end of the said shaft 28 is operatively connected with the shaft 16 by means of a universal joint 29. The intermediate portion of a hoe arm 30 is pivoted upon the crank of the shaft 28 and the said arm 30 is provided at its lower end with a hoe blade 31. Bearings 32 are connected with any appropriate part of the frame of the cultivator and a shaft 33 is journaled in the said bearings 32. Arms 34 are rigidly attached at one end to the shaft 33 and at their other ends the said arms converge toward each other and are pivotally connected with the upper end of the hoe arm 30. The arms 34 extend transversely across the axis of the crank shaft 28 and the arm 30 also lies transversely across the axis of the said shaft 28. Consequently the pivotal connections between the arms 34 and 30 are at one side of the axis of the shaft 28 while the hoe blade 31 and the shaft 33 are at the other side of the axis of the shaft 28.

When the parts are applied to the frame of a cultivator as indicated the lever 13 is moved so that the clutch member 12 is in engagement with the clutch hub 11 of the wheel 8. As the frame is drawn along a row of plants rotary movement is transmitted from the wheel 2 to the shaft 6 and from the shaft 6 through the intermeshing gear wheels 7 and 17 to the shaft 28. As the crank of the said shaft 28 rotates above the axis of the shaft, the hoe arm 30 is reciprocated in a vertical plane and at the same time is moved longitudinally by reason of the fact that its upper end is connected with the free ends of the arms 34 which in turn are rigidly connected with the journaled shaft 33. Thus the hoe blade 31 is caused to travel in an orbit and is in a depressed position when its chopping edge is moving toward the row of plants and is in an elevated position when its chopping edge is disposed in the direction opposite to its movement when passing over the plants. Thus it will be seen that as the device passes along the row of plants the hoe blade will chop out plants at intervals and leave plants standing in the row between such intervals.

A cross bar 35 is connected at its ends with the intermediate portions of the beams 36 and the lower portion of the frame 26 is provided with guides 37 in which a rod 38 is slidably located. The said rod 38 is mounted at its lower end upon the cross bar 35. Consequently as the said beams 36 are swung laterally, the frame 26 will move laterally upon the cross bar 20 and thus the rear portion of the shaft 28 will be moved correspondingly and the chopping operation will at all times occur approximately midway between the beams 36.

Thus it will be seen that a simple attachment is provided which may be applied to the frame of a cultivator for chopping out undesirable plants while the row is cultivated and that in its application to the frame of the cultivator it is not necessary to alter or mutilate the said frame or disturb the normal relations of the parts of the cultivator.

Having described the invention, what I claim as new and desire to secure by Letters Patent is:—

1. A chopper attachment for a wheel cultivator comprising bearings adapted to be applied to the frame of a cultivator, a shaft journaled in said bearings, means for operatively connecting said shaft with one of the supporting wheels of the cultivator, a bar adapted to be applied to the cultivator, a sub-shaft journaled upon said bar, intermeshing wheels connecting said sub-shaft with the first said shaft, a frame adapted to be supported upon the cultivator frame, a crank shaft journaled in said frame, a universal joint connecting said crank shaft to the sub-shaft, a hoe arm pivoted on the crank of the crank shaft, a hoe blade carried by said hoe arm, a second set of bearings adapted to be applied to the frame of the cultivator, a shaft journaled in the last said bearings, an arm fixed to the last said shaft and pivotally connected with the upper end of the hoe arm.

2. A chopper attachment adapted to be applied to a wheel cultivator comprising bearings adapted to be attached to the arch bar of the cultivator, a shaft journaled in said bearings, means operatively connecting said shaft with one of the supporting wheels of the cultivator, a bar adapted to be attached to the arch bar, a sub-shaft journaled on said bar, means operatively connecting said sub-shaft with the first said shaft, guides mounted upon the cultivator frame, rods adjustably mounted in said guides, a cross bar adjustably connecting the upper ends of the said rods, a lever mechanism for raising and lowering the cross bar and rods, a cross bar fixed to the lower ends of the rods, a frame slidably mounted upon the last said cross bar, a crank shaft journaled at one end in the lower portion of said frame, a universal joint connecting the forward end of said crank shaft with said sub-shaft, a hoe arm pivoted upon the crank of the crank shaft, a hoe blade carried by said hoe arm, bearings adapted to be attached to the frame of the cultivator, a shaft journaled in said bearings, arms attached to said shaft and converging toward each other at their outer ends and pivotally connected with the upper end of the hoe arm.

In testimony that I claim the foregoing as my own, I have hereto affixed my signature in the presence of two witnesses.

HARVEY SCOTT BERRY.

Witnesses:
    Z. T. WRAY,
    C. P. HASKINS.